US012736704B2

(12) United States Patent
Ma et al.

(10) Patent No.: US 12,736,704 B2
(45) Date of Patent: Sep. 15, 2026

(54) NEIGHBORING RESISTIVITY ANISOTROPY DETERMINATION

(71) Applicant: Halliburton Energy Services, Inc., Houston, TX (US)

(72) Inventors: Jin Ma, Houston, TX (US); Dagang Wu, Houston, TX (US); Hsu-Hsiang Wu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 168 days.

(21) Appl. No.: 18/652,531

(22) Filed: May 1, 2024

(65) Prior Publication Data

US 2025/0341652 A1 Nov. 6, 2025

(51) Int. Cl.
*G01V 3/28* (2006.01)

(52) U.S. Cl.
CPC .................................... *G01V 3/28* (2013.01)

(58) Field of Classification Search
CPC ........................................................ G01V 3/28
USPC ...................... 324/500, 600, 76.11, 340–345
See application file for complete search history.

(56) References Cited

U.S. PATENT DOCUMENTS

| | | | |
|---|---|---|---|
| 10,227,861 | B2 | 3/2019 | Wu et al. |
| 10,330,818 | B2 | 6/2019 | Hou et al. |
| 10,416,336 | B2 | 9/2019 | Li et al. |
| 10,436,930 | B2 | 10/2019 | Wu et al. |
| 10,436,931 | B2 | 10/2019 | Pan et al. |
| 10,788,601 | B2 | 9/2020 | Wu et al. |
| 11,143,023 | B2 | 10/2021 | Ma et al. |
| 11,169,297 | B2 | 11/2021 | Bittar et al. |
| 11,339,650 | B2 | 5/2022 | Bittar et al. |
| 11,434,750 | B2 | 9/2022 | Wu et al. |
| 11,442,196 | B2 | 9/2022 | Wu |
| 11,459,870 | B2 | 10/2022 | Ma et al. |
| 11,467,312 | B2 | 10/2022 | Pan et al. |
| 11,605,872 | B2 | 3/2023 | Wu et al. |
| 11,874,424 | B2 | 1/2024 | Pan et al. |
| 11,874,425 | B2 | 1/2024 | Pan et al. |
| 11,876,567 | B2 | 1/2024 | Fan et al. |

(Continued)

OTHER PUBLICATIONS

International Search Report and Written Opinion for International Patent Application No. PCT/US2025/021376 dated Jul. 2, 2025. PDF file. 10 pages.

*Primary Examiner* — Giovanni Astacio-Oquendo
*Assistant Examiner* — Trung Q Nguyen
(74) *Attorney, Agent, or Firm* — Benjamin Ford; C. Tumey Law Group PLLC

(57) ABSTRACT

A method and system for identifying anisotropy properties in a formation. The method may include disposing a logging tool into a formation, wherein the logging tool may include an electromagnetic transmitter antenna and an electromagnetic receiver antenna. The method may further include transmitting an electric field signal into the formation from the electromagnetic transmitter antenna, receiving a reflected electric field signal or a magnetic field signal from the formation with the electromagnetic receiver antenna, measuring the reflected electric field signal or the magnetic field signal from the formation with the electromagnetic receiver antenna, and identifying one or more anisotropy properties of adjacent layers in the formation from the reflected electric field signal or the magnetic field signal.

20 Claims, 13 Drawing Sheets

(56) References Cited

U.S. PATENT DOCUMENTS

| | | | | |
|---|---|---|---|---|
| 11,953,639 | B2 | 4/2024 | Fan et al. | |
| 2003/0200029 | A1 | 10/2003 | Omeragic et al. | |
| 2005/0088181 | A1* | 4/2005 | Barber | G01V 3/28 324/346 |
| 2006/0255810 | A1* | 11/2006 | Yu | E21B 47/024 324/338 |
| 2007/0024286 | A1* | 2/2007 | Wang | G01V 3/28 324/338 |
| 2008/0184144 | A1 | 7/2008 | Matsutsuka | |
| 2010/0007348 | A1* | 1/2010 | Fang | G01V 3/28 324/339 |
| 2014/0149040 | A1 | 5/2014 | Omeragic et al. | |
| 2014/0163887 | A1 | 6/2014 | Wu et al. | |
| 2014/0324353 | A1 | 10/2014 | Hou et al. | |
| 2016/0054467 | A1 | 2/2016 | Li et al. | |
| 2016/0178787 | A1* | 6/2016 | Le | G01V 3/38 702/7 |
| 2016/0258273 | A1 | 9/2016 | Hou et al. | |
| 2016/0370489 | A1* | 12/2016 | Arsalan | E21B 47/13 |
| 2018/0335542 | A1* | 11/2018 | Jannin | E21B 47/13 |
| 2018/0335543 | A1 | 11/2018 | Wu | |
| 2019/0112921 | A1 | 4/2019 | Hagiwara | |
| 2019/0113439 | A1* | 4/2019 | San Martin | E21B 47/006 |
| 2020/0240261 | A1 | 7/2020 | Wu et al. | |
| 2020/0300084 | A1 | 9/2020 | Bittar et al. | |
| 2020/0363558 | A1 | 11/2020 | Bittar et al. | |
| 2020/0378247 | A1 | 12/2020 | Ma et al. | |
| 2022/0381133 | A1 | 12/2022 | Ge et al. | |
| 2023/0145563 | A1 | 5/2023 | Pan et al. | |

* cited by examiner

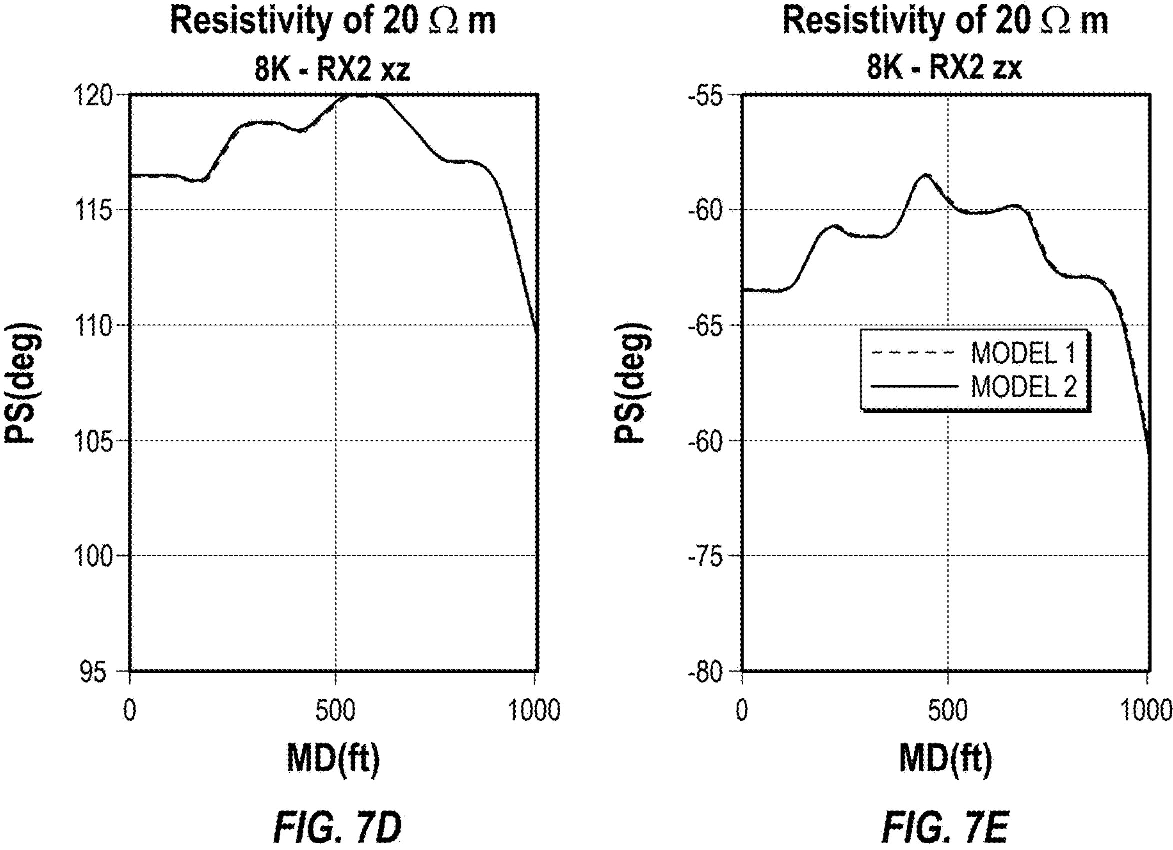
FIG. 7D
FIG. 7E
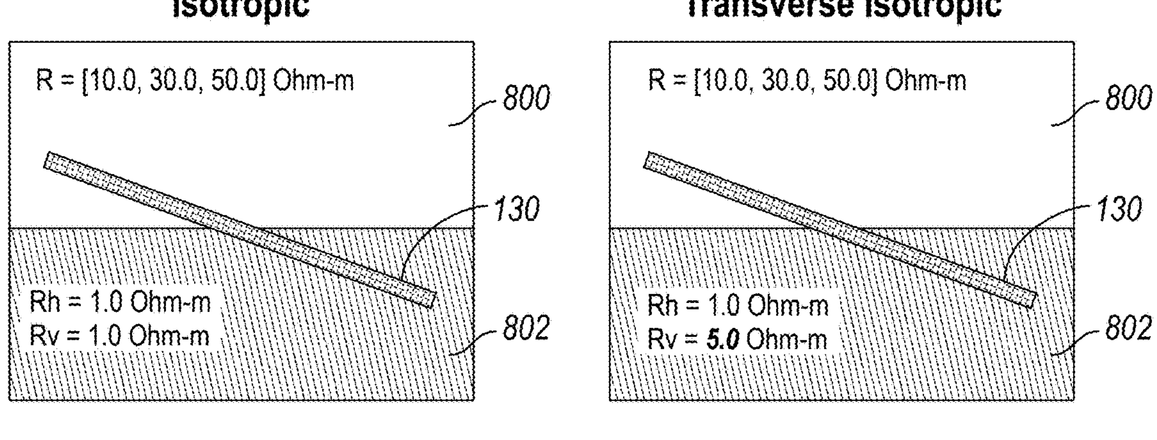
FIG. 8A
FIG. 8B

NEIGHBORING RESISTIVITY ANISOTROPY DETERMINATION

BACKGROUND

Wellbores drilled into subterranean formations may enable recovery of desirable fluids (e.g., hydrocarbons) using a number of different techniques. A logging tool may be employed in subterranean operations to determine wellbore and/or formation properties. As measurements from deeper formation away from the wellbores are more and more essential for reservoir exploration, logging tools may become longer and more sophisticated. Measurements by antennas on the logging tool may provide information that may allow an operator to determine wellbore and/or formation properties. However, logging tools that measure magnetic field signals exhibit very low or negligible sensitivity in distinguishing formation anisotropy in the shoulder beds when the current layer resistivity is high. This is common in reservoir formations, where personnel seek to differentiate between neighboring low-resistivity layers, such as water or sand-shale laminations, based on their anisotropy.

BRIEF DESCRIPTION OF THE DRAWINGS

These drawings illustrate certain aspects of some examples of the present disclosure and should not be used to limit or define the disclosure.

FIGS. 7A-7E are graphs showing measurements using coil antenna in the anisotropy area with a resistivity of 100 Ω·m;

FIGS. 8A and 8B are graphs modeling isotropic and transverse isotropic formation.

DETAILED DESCRIPTION

The present disclosure relates generally to methods and systems for a logging tool to measure with a higher sensitivity anisotropy difference within shoulder beds of a formation. Current 1D inversion methods are unable to accurately identify the anisotropy of these neighboring layers due to the limited sensitivity of the measurements. The use of electric field antenna alone or pared with coil antenna to take measurements of neighboring layers in a shoulder bed formation to detect the differences in areas of an anisotropy formation.

Figure 1:
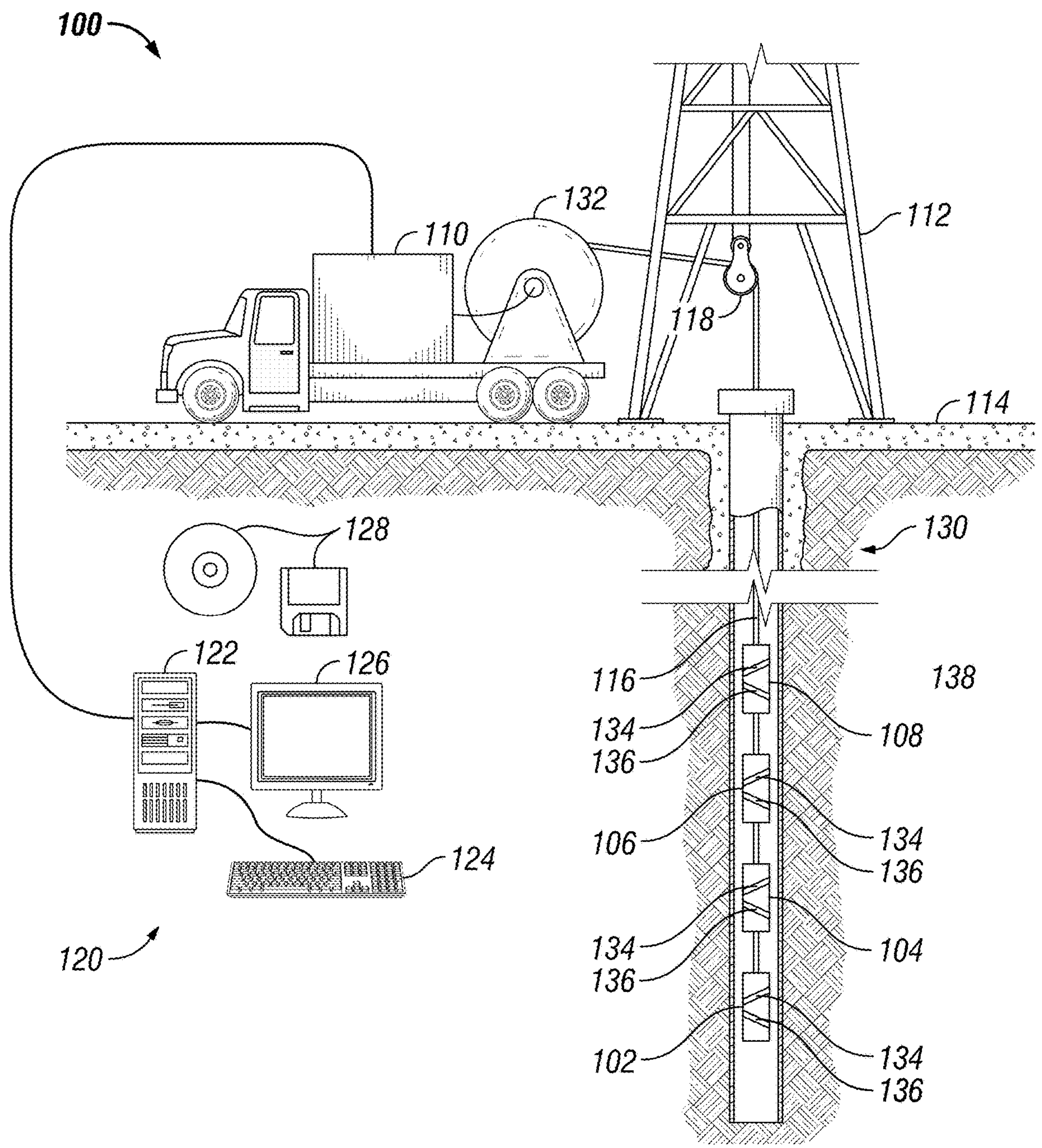
FIG. 1 illustrate an example of a well measurement system.

FIG. 1 illustrates a cross-sectional view of a well measurement system 100. As illustrated, well measurement system 100 may include a first sub assembly 102, a second sub assembly 104, a third sub assembly 106, and/or a fourth sub assembly 108. Each sub assembly may work together as a logging tool. It should be noted that well measurement system 100 may include only first sub assembly 102. As illustrated, first sub assembly 102, second sub assembly 104, third sub assembly 106, and/or fourth sub assembly 108 may attach to a vehicle 110. In examples, it should be noted that first sub assembly 102, second sub assembly 104, third sub assembly 106, and/or fourth sub assembly 108 may not be attached to a vehicle 110. First sub assembly 102, second sub assembly 104, third sub assembly 106, and/or fourth sub assembly 108 may be supported by rig 112 at surface 114. First sub assembly 102, second sub assembly 104, third sub assembly 106, and/or fourth sub assembly 108 may be tethered to vehicle 110 through conveyance 116. Conveyance 116 may be disposed around one or more sheave wheels 118 to vehicle 110. Conveyance 116 may include any suitable means for providing mechanical conveyance for first sub assembly 102, second sub assembly 104, third sub assembly 106, and/or fourth sub assembly 108, including, but not limited to, wireline, slickline, coiled tubing, pipe, drill pipe, downhole tractor, or the like. In some embodiments, conveyance 116 may provide mechanical suspension, as well as electrical connectivity, for first sub assembly 102, second sub assembly 104, third sub assembly 106, and/or fourth sub assembly 108. Conveyance 116 may include, in some instances, a plurality of electrical conductors extending from vehicle 110. Conveyance 116 may include an inner core of several electrical conductors covered by an insulating wrap. An inner and outer steel armor sheath may be wrapped in a helix in opposite directions around the conductors. Electrical conductors may be used for communicating power and telemetry between vehicle 110 and first sub assembly 102, second sub assembly 104, third sub assembly 106, and/or fourth sub assembly 108. Information from first sub assembly 102, second sub assembly 104, third sub assembly 106, and/or fourth sub assembly 108 may be gathered and/or processed by information handling system 120. For example, signals recorded by first sub assembly 102, second sub assembly 104, third sub assembly 106, and/or fourth sub assembly 108 may be stored on memory and then processed by first sub assembly 102, second sub assembly 104, third sub assembly 106, and/or fourth sub assembly 108. The processing may be performed real-time during data acquisition or after recovery of first sub assembly 102, second sub assembly 104, third sub assembly 106, and/or fourth sub assembly 108. Processing may alternatively occur downhole or may occur both downhole and at surface. In some embodiments, signals recorded by first sub assembly 102, second sub assembly 104, third sub assembly 106, and/or fourth sub assembly 108 may be conducted to information handling system 120 by way of conveyance 116. Information handling system 120 may process the signals, and the information contained therein may be displayed for an operator to observe and stored for future processing and reference. Information handling system 120 may also contain an apparatus for supplying control signals and power to first sub assembly 102, second sub assembly 104, third sub assembly 106, and/or fourth sub assembly 108.

Systems and methods of the present disclosure may be implemented, at least in part, with information handling system 120. Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. Information handling system 120 may include random access memory (RAM), one or more processing resources such as a central processing unit (CPU) 122 or hardware or software control logic, ROM, and/or other types of nonvolatile memory. Additional components of the information handling system 120 may include one or more disk drives, one or more network ports for communication with external devices as well as an input device 124 (e.g., keyboard, mouse, etc.) and output devices, such as a video display 126. Information handling system 120 may also include one or more buses operable to transmit communications between the various hardware components.

Alternatively, systems and methods of the present disclosure may be implemented, at least in part, with non-transitory computer-readable media 128. Non-transitory computer-readable media 128 may include any instrumentality or aggregation of instrumentalities that may retain data and/or instructions for a period of time. Non-transitory computer-readable media 128 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 112 includes a load cell (not shown) which may determine the amount of pull on conveyance 116 at the surface of wellbore 130. Information handling system 120 may include a safety valve which controls the hydraulic pressure that drives drum 132 on vehicle 110 which may reel up and/or release conveyance 116 which may move first sub assembly 102, second sub assembly 104, third sub assembly 106, and/or fourth sub assembly 108 up and/or down wellbore 130. The safety valve may be adjusted to a pressure such that drum 132 may only impart a small amount of tension to conveyance 116 over and above the tension necessary to retrieve conveyance 116 and/or first sub assembly 102, second sub assembly 104, third sub assembly 106, and/or fourth sub assembly 108 from wellbore 130. The safety valve is typically set a few hundred pounds above the amount of desired safe pull on conveyance 116 such that once that limit is exceeded; further pull on conveyance 116 may be prevented.

In examples, first sub assembly 102, second sub assembly 104, third sub assembly 106, and/or fourth sub assembly 108 may include an electromagnetic transmitter antenna 134 and/or an electromagnetic receiver antenna 136. Electromagnetic transmitter antenna 134 and electromagnetic receiver antenna 136 may each be a solenoid coil, a plurality of solenoid coils, a toroidal coil, a plurality of toroidal coils, an antenna, a plurality of antennas, a coil, a plurality of coils, and/or any combination thereof. Additionally, both electromagnetic transmitter antenna 134 and electromagnetic receiver antenna 136 may be each comprise of collocated plurality of solenoid coils, plurality of toroidal coils, a plurality of antennas, a plurality of coils, and/or any combination thereof. It should be noted that both electromagnetic transmitter antenna 134 and electromagnetic receiver antenna 136 may be referred to as an electromagnetic antenna either individually or as a whole. In examples, first sub assembly 102, second sub assembly 104, third sub assembly 106, and/or fourth sub assembly 108 may operate with additional equipment (not illustrated) on surface 114 and/or disposed in a separate well measurement system (not illustrated) to record measurements and/or values from formation 138 of naturally occurring or electrically induced magnetic field signals or electric field signals. During operations, electromagnetic transmitter antenna 134 may broadcast an electric field signal from first sub assembly 102, second sub assembly 104, third sub assembly 106, and/or fourth sub assembly 108. Electromagnetic transmitter antenna 134 may be connected to information handling system 120, which may further control the operation of electromagnetic transmitter antenna 134. Additionally, electromagnetic receiver antenna 136 may measure and/or record electric field signals or magnetic field signals broadcasted from electromagnetic transmitter antenna 134 and/or signal broadcasting from electromagnetic transmitter antenna 134 that are reflected within formation 138 as reflected electric field signals or reflected magnetic field signals. For example, electromagnetic receiver antenna 136 may receiver and/or measure a reflected electric field signal and/or an altered magnetic field. Electromagnetic receiver antenna 136 may transfer recorded information to information handling system 120. Information handling system 120 may control the operation of electromagnetic receiver antenna 136. For example, the broadcasted electric field signal and/or magnetic field signal from electromagnetic transmitter antenna 134 may be reflected and/or altered by formation 138. The reflected electric field signal or altered magnetic field signal may be recorded by electromagnetic receiver antenna 136. The recorded signal may be transferred to information handling system 120 for further processing. In examples, there may be any suitable number of electromagnetic transmitter antennas 134 and/or electromagnetic receiver antennas 136, which may be controlled by information handling system 120. Information and/or measurements may be processed further by information handling system 120 to determine properties of wellbore 130, fluids, and/or formation 138.

Figure 2:
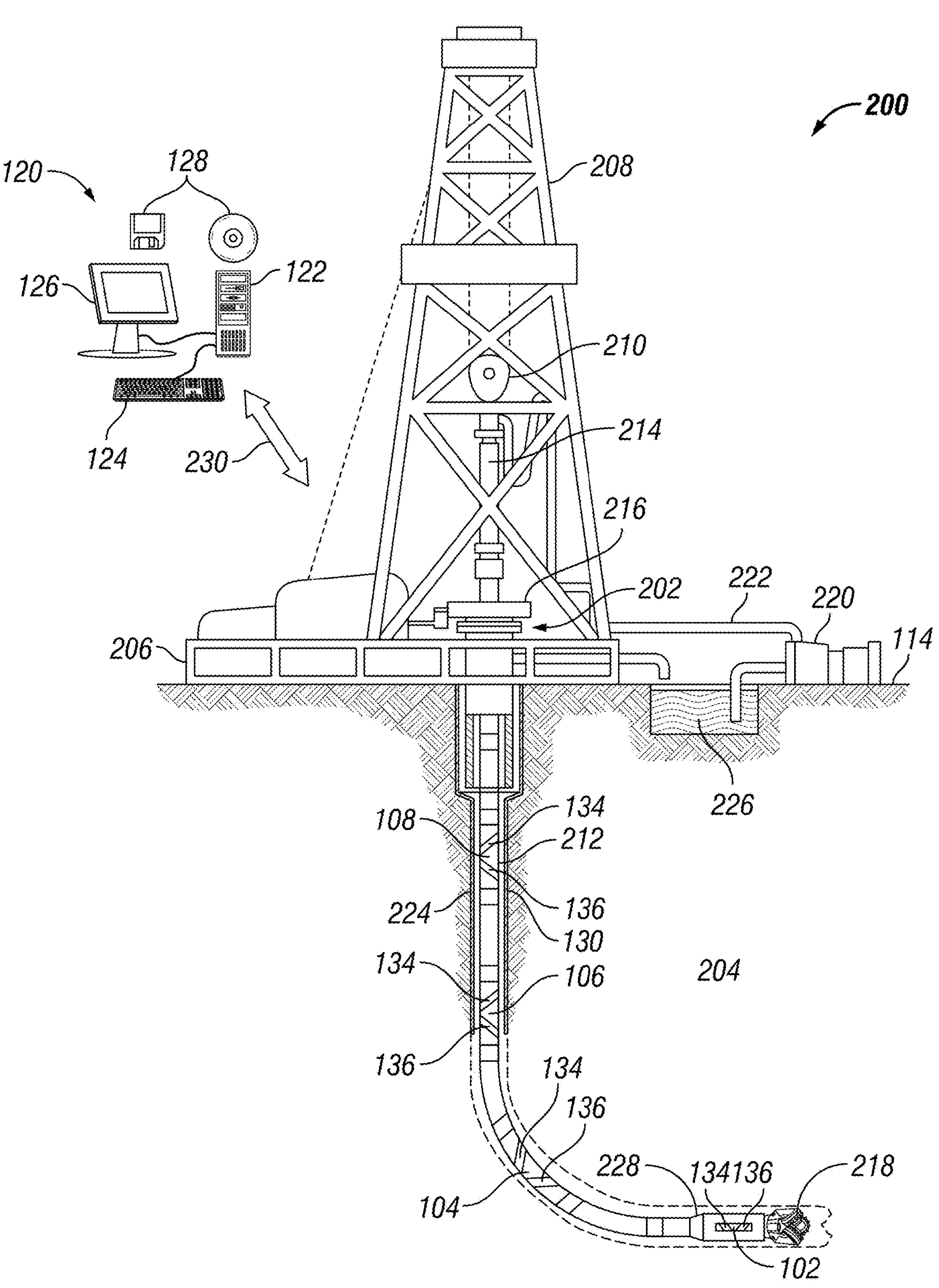
FIG. 2 illustrates another example of a well measurement system.

FIG. 2 illustrates an example in which first sub assembly 102, second sub assembly 104, third sub assembly 106, and/or fourth sub assembly 108 (e.g., Referring to FIG. 1) may be disposed in a drilling system 200. As illustrated, wellbore 130 may extend from a wellhead 202 into a subterranean formation 204 from surface 114 (e.g., Referring to FIG. 1). Generally, wellbore 130 may include horizontal, vertical, slanted, curved, and other types of wellbore geometries and orientations. Wellbore 130 may be cased or uncased. In examples, wellbore 130 may include a metallic material. By way of example, the metallic member may be a casing, liner, tubing, or other elongated steel tubular disposed in wellbore 130.

As illustrated in FIG. 2, wellbore 130 may extend through subterranean formation 204. Without limitation, wellbore 130 may extend generally vertically into the subterranean formation 204, however wellbore 130 may extend at an angle through subterranean formation 204, such as horizontal and slanted wellbores. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 114. Without limitation, drill bit 218 may include roller cone bits, PDC bits, natural diamond bits, any hole openers, reamers, coring bits, and the like. As drill bit 218 rotates, it may create and extend wellbore 130 that penetrates various subterranean formations 204. A pump 220 may circulate drilling fluid through a feed pipe 222 to kelly 214, downhole through interior of drill string 212, through orifices in drill bit 218, back to surface 114 via annulus 224 surrounding drill string 212, and into a retention pit 226.

With continued reference to FIG. 2, drill string 212 may begin at wellhead 202 and may traverse wellbore 130. Drill bit 218 may be attached to a distal end of drill string 212 and may be driven, for example, either by a downhole motor and/or via rotation of drill string 212 from surface 114 (e.g., Referring to FIG. 1). Drill bit 218 may be a part of bottom hole assembly 228 at distal end of drill string 212. Bottom hole assembly 228 may further include first sub assembly 102 (e.g., Referring to FIG. 1). First sub assembly 102 may be disposed on the outside and/or within bottom hole assembly 228. It should be noted that second sub assembly 104, third sub assembly 106, and/or fourth sub assembly 108 may be disposed on drill string 212. Second sub assembly 104, third sub assembly 106, and/or fourth sub assembly 108 may be disposed on the outside and/or within drill string 212. First sub assembly 102, second sub assembly 104, third sub assembly 106, and/or fourth sub assembly 108 may include an electromagnetic transmitter antenna 134 and/or an electromagnetic receiver antenna 136 (e.g., Referring to FIG. 1). It should be noted that first sub assembly 102, second sub assembly 104, third sub assembly 106, and/or fourth sub assembly 108 may include a plurality of transmitters 134 and/or receivers 136. Transmitters 134 and/or receivers 136 may operate and/or function as described above. As will be appreciated by those of ordinary skill in the art, first sub assembly 102, second sub assembly 104, third sub assembly 106, and/or fourth sub assembly 108 may be a measurement-while drilling (MWD) or logging-while-drilling (LWD) system.

Without limitation, first sub assembly 102, second sub assembly 104, third sub assembly 106, and/or fourth sub assembly 108, electromagnetic transmitter antennas 134, and/or electromagnetic receiver antennas 136 may be connected to and/or controlled by information handling system 120 (e.g., Referring to FIG. 1), which may be disposed on surface 114. Without limitation, information handling system 120 may be disposed down hole in first sub assembly 102, second sub assembly 104, third sub assembly 106, and/or fourth sub assembly 108. Processing of information recorded may occur down hole and/or on surface 114. Processing occurring downhole may be transmitted to surface 114 to be recorded, observed, and/or further analyzed. Additionally, information recorded on information handling system 120 that may be disposed down hole may be stored until first sub assembly 102, second sub assembly 104, third sub assembly 106, and/or fourth sub assembly 108 may be brought to surface 114. In examples, information handling system 120 may communicate with first sub assembly 102, second sub assembly 104, third sub assembly 106, and/or fourth sub assembly 108 through a communication line (not illustrated) disposed in (or on) drill string 212. In examples, wireless communication may be used to transmit information back and forth between information handling system 120 and first sub assembly 102, second sub assembly 104, third sub assembly 106, and/or fourth sub assembly 108. Information handling system 120 may transmit information to first sub assembly 102, second sub assembly 104, third sub assembly 106, and/or fourth sub assembly 108 and may receive as well as process information recorded by first sub assembly 102, second sub assembly 104, third sub assembly 106, and/or fourth sub assembly 108. In examples, a downhole information handling system (not illustrated) may include, without limitation, a microprocessor or other suitable circuitry, for estimating, receiving and processing signals from first sub assembly 102, second sub assembly 104, third sub assembly 106, and/or fourth sub assembly 108. Downhole information handling system (not illustrated) may further include additional components, such as memory, input/output devices, interfaces, and the like. In examples, while not illustrated, first sub assembly 102, second sub assembly 104, third sub assembly 106, and/or fourth sub assembly 108 may include one or more additional components, such as analog-to-digital converter, filter and amplifier, among others, that may be used to process the measurements of first sub assembly 102, second sub assembly 104, third sub assembly 106, and/or fourth sub assembly 108 before they may be transmitted to surface 114. Alternatively, raw measurements from first sub assembly 102, second sub assembly 104, third sub assembly 106, and/or fourth sub assembly 108 may be transmitted to surface 114.

Any suitable technique may be used for transmitting signals from first sub assembly 102, second sub assembly 104, third sub assembly 106, and/or fourth sub assembly 108 to surface 114, including, but not limited to, wired pipe telemetry, mud-pulse telemetry, acoustic telemetry, and electromagnetic telemetry. While not illustrated, first sub assembly 102, second sub assembly 104, third sub assembly 106, and/or fourth sub assembly 108 may include a telemetry subassembly that may transmit telemetry data to surface 114. Without limitation, an electromagnetic source in the telemetry subassembly may be operable to generate pressure pulses in the drilling fluid that propagates along the fluid stream to surface 114. At surface 114, pressure transducers (not shown) may convert the pressure signal into electrical signals for a digitizer (not illustrated). The digitizer may supply a digital form of the telemetry signals to information handling system 120 via a communication link 230, which may be a wired or wireless link. The telemetry data may be analyzed and processed by information handling system 120.

As illustrated, communication link 230 (which may be wired or wireless, for example) may be provided that may transmit data from first sub assembly 102, second sub assembly 104, third sub assembly 106, and/or fourth sub assembly 108 to an information handling system 120 at surface 114. Information handling system 120 may include a central processing unit 122 (e.g., Referring to FIG. 1), a video display 126 (e.g., Referring to FIG. 1), an input device 124 (e.g., keyboard, mouse, etc.) (e.g., Referring to FIG. 1), and/or non-transitory computer-readable media 128 (e.g., optical disks, magnetic disks) (e.g., Referring to FIG. 1) that may store code representative of the methods described herein. In addition to, or in place of processing at surface 114, processing may occur downhole.

First sub assembly 102, second sub assembly 104, third sub assembly 106, and/or fourth sub assembly 108 may comprise an electromagnetic transmitter antenna 134 and/or an electromagnetic receiver antenna 136. In examples, first sub assembly 102, second sub assembly 104, third sub assembly 106, and/or fourth sub assembly 108 may operate with additional equipment (not illustrated) on surface 114 and/or disposed in a separate well measurement system (not illustrated) to record measurements and/or values from subterranean formation 204. During operations, electromagnetic transmitter antenna 134 may broadcast a signal from first sub assembly 102, second sub assembly 104, third sub assembly 106, and/or fourth sub assembly 108. Electromagnetic transmitter antenna 134 may be connected to information handling system 120, which may further control the operation of electromagnetic transmitter antenna 134. Additionally, electromagnetic receiver antenna 136 may measure and/or record signals broadcasted from electromagnetic transmitter antenna 134. Electromagnetic receiver antenna 136 may transfer recorded information to information handling system 120. Information handling system 120 may control the operation of electromagnetic receiver antenna 136. For example, the broadcasted signal from electromagnetic transmitter antenna 134 may be reflected by subterranean formation 204. The reflected signal may be recorded by electromagnetic receiver antenna 136. The recorded signal may be transferred to information handling system 120 for further processing. In examples, there may be any suitable number of transmitters 134 and/or receivers 136, which may be controlled by information handling system 120. Information and/or measurements may be processed further by information handling system 120 to determine properties of wellbore 130 (e.g., Referring to FIG. 1), fluids, and/or subterranean formation 204.

Figure 3:
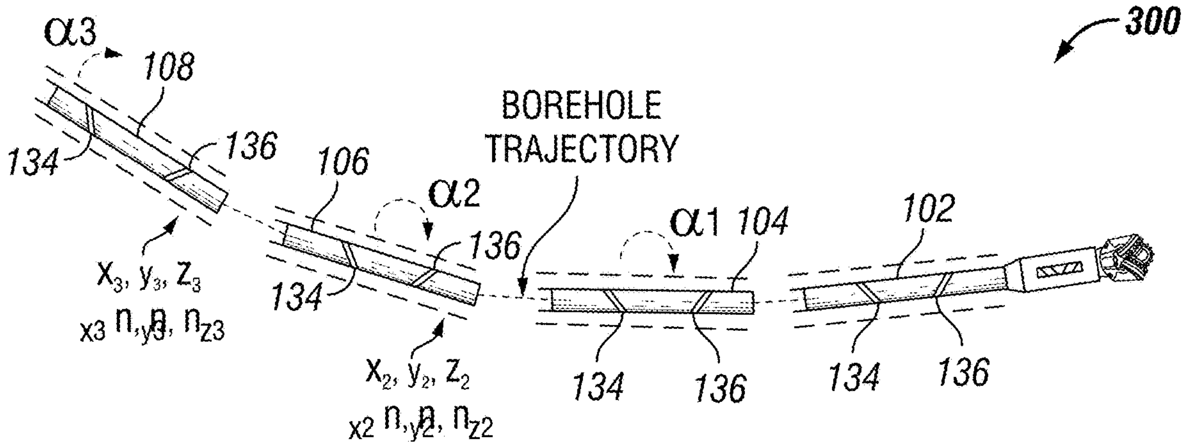
FIG. 3 illustrates an example of a logging tool.

As illustrated in FIG. 3, a logging tool 300 may include first sub assembly 102, second sub assembly 104, third sub assembly 106, and/or fourth sub assembly 108 (e.g., Referring to FIG. 1). As illustrated, longer spacing between electromagnetic transmitter antennas 134 and/or electromagnetic receiver antennas 136 between first sub assembly 102, second sub assembly 104, third sub assembly 106, and/or fourth sub assembly 108 may make it difficult to decouple multi-components from spaced antennas. Conventional methods use depth shifting or averaging to create pseudo-collate antennas, which may work accurately for traditional one sub resistivity tools, where there may not be an azimuth offset between electromagnetic transmitter antenna 134 and electromagnetic receiver antenna 136. However, when an azimuth offset may be between electromagnetic transmitter antenna 134 and electromagnetic receiver antenna 136, the conventional way to decouple multi-components becomes troublesome and inaccurate. For example, a ninety-degree azimuth offset between electromagnetic transmitter antenna 134 and electromagnetic receiver antenna 136 may lead to inaccurate measurements in the form of a singularity. As disclosed below, a method may be utilized to decouple multi-components from spaced antennas with any azimuth offset between electromagnetic transmitter antenna 134 and electromagnetic receiver antenna 136, and thus provides accurate and stable component signals as inputs for inversion calculations for any configurations of logging tool 300 or formation properties.

Logging tool 300 (e.g., Referring to FIG. 3) may include first sub assembly 102, second sub assembly 104, third sub assembly 106, and/or fourth sub assembly 108. For logging tool 300 with electromagnetic transmitter antenna 134, which may be a tilted transmitter, and electromagnetic receiver antenna 136 (normally LWD tool, e.g., referring to FIG. 2), or logging tool 300 with electromagnetic transmitter antenna 134, which may be tri-axial, and electromagnetic receiver antenna 136 (normally a conveyance, e.g., referring to FIG. 1), responses from first sub assembly 102, second sub assembly 104, third sub assembly 106, and/or fourth sub assembly 108 may be broken into the following components:

$$\begin{bmatrix} z_{XX} & z_{XY} & z_{XZ} \\ Z_{YX} & z_{YY} & Z_{YZ} \\ Z_{ZX} & Z_{ZY} & Z_{ZZ} \end{bmatrix} \tag{1}$$

where Z symbolizes mutual impedance, which is complex number, $Z_{xx}$, $Z_{yy}$, $Z_{zz}$ are known as the direct-coupling components and $Z_{xy}$, $Z_{yx}$, $Z_{xz}$, $Z_{zx}$, $Z_{yz}$, $Z_{zy}$ are known as the cross-coupling components.

Figure 4:
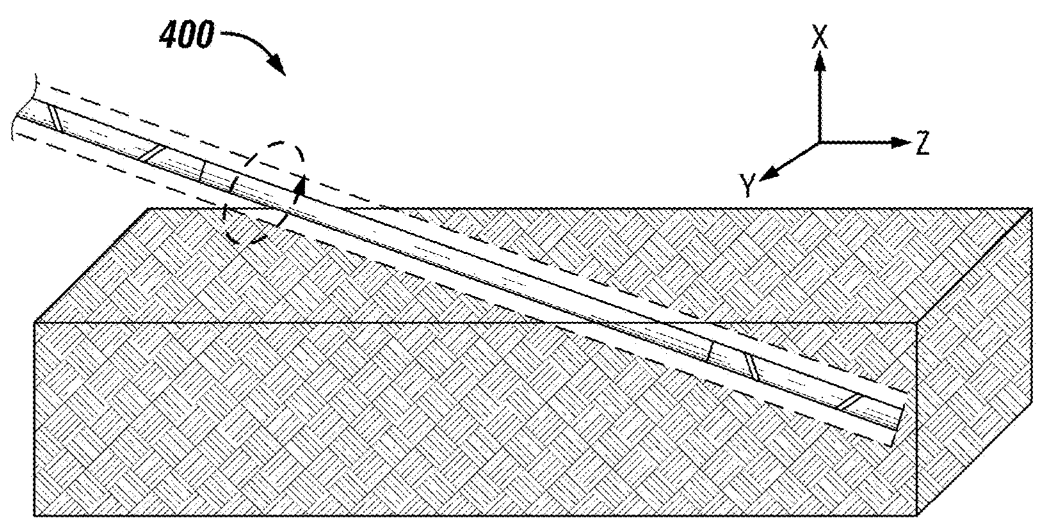
FIG. 4 illustrates an example of a logging tool in an orientation schematic.
Figures 5A, 5B:
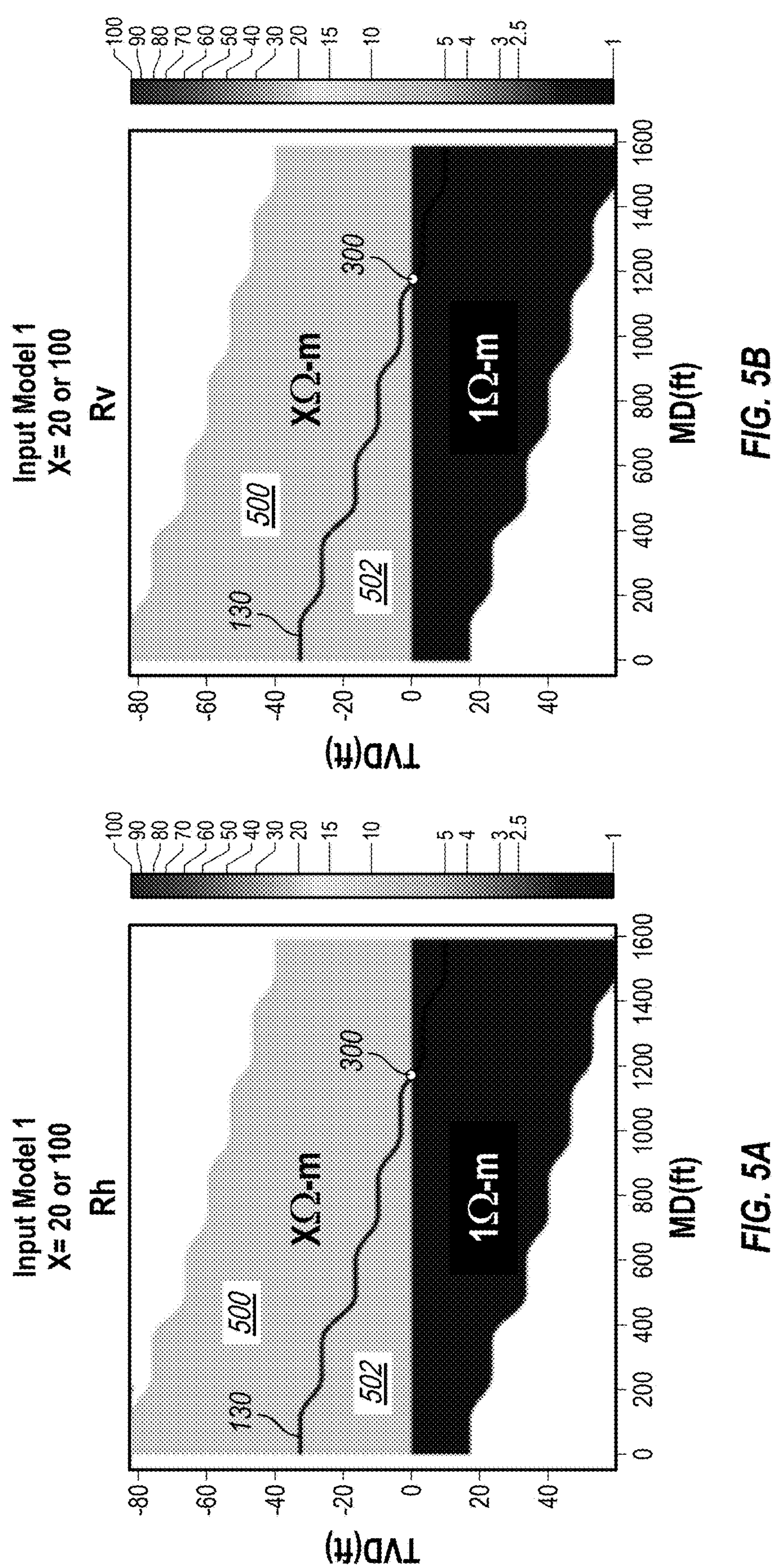
FIGS. 5A-5D are graphs modeling bed boundaries in anisotropy areas of a formation.
Figures 5C, 5D:
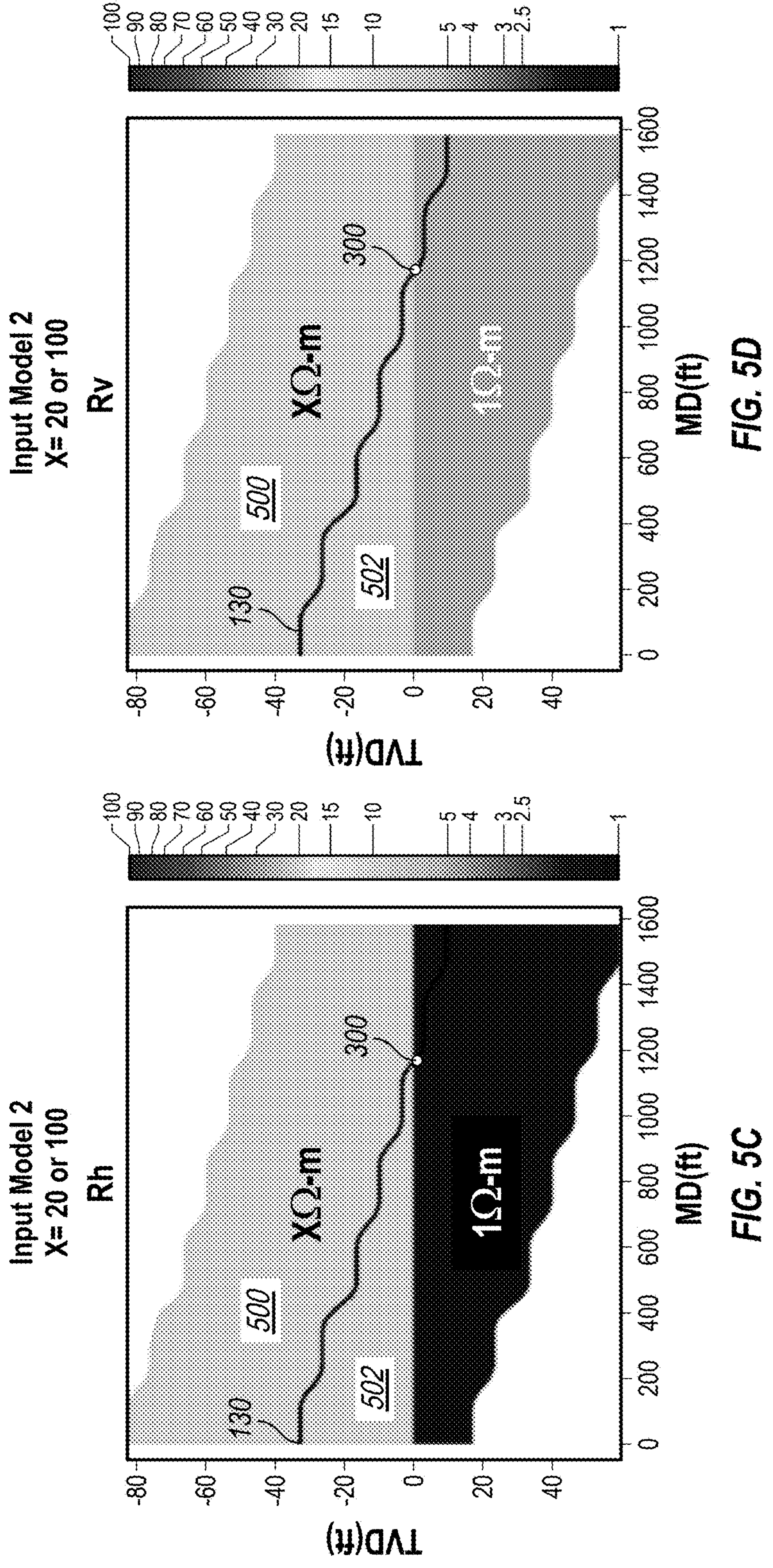
Figures 6A, 6B, 6C:
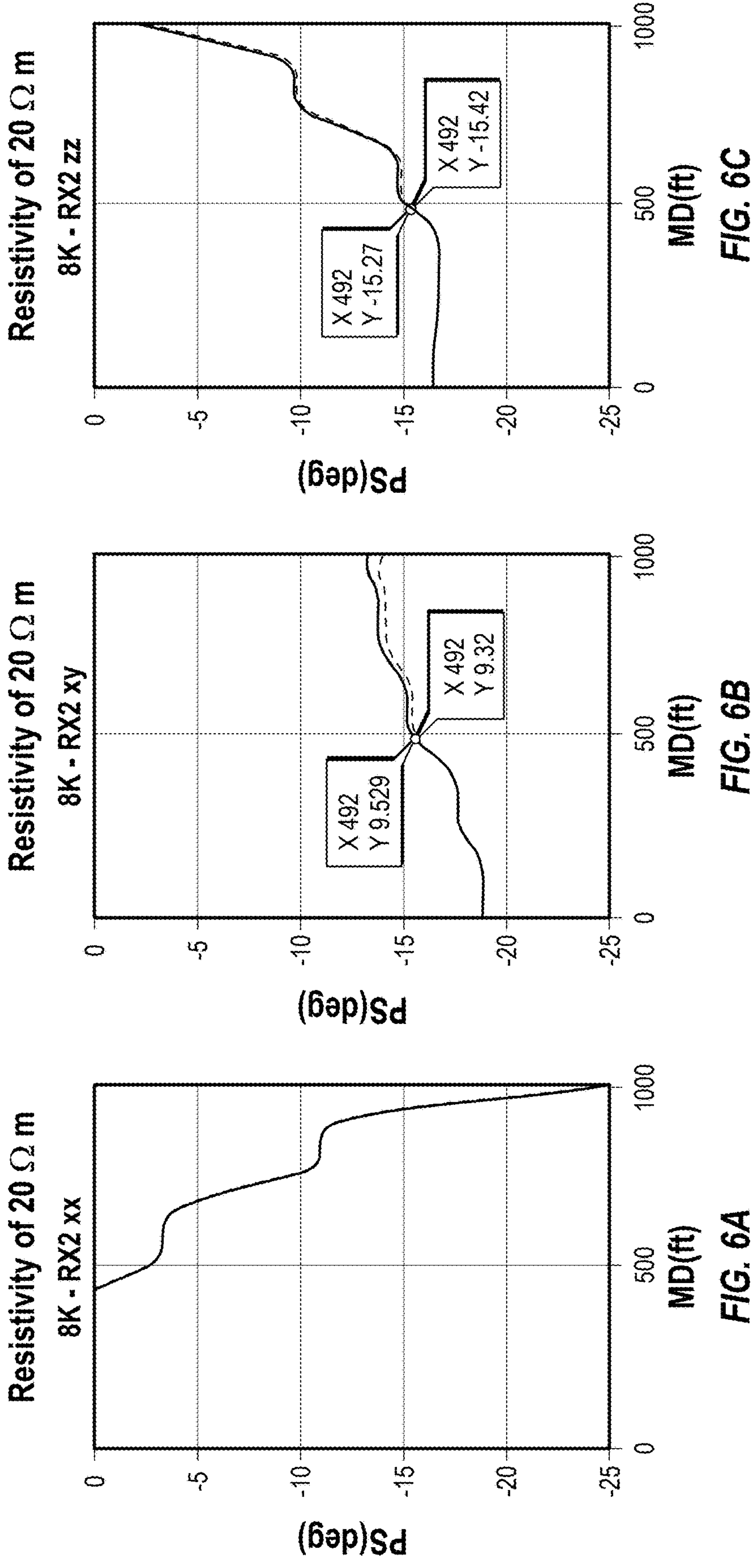
FIGS. 6A-6E are graphs showing measurements using coil antenna in the anisotropy area with a resistivity of 2 Ω·m.
Figure 6E:
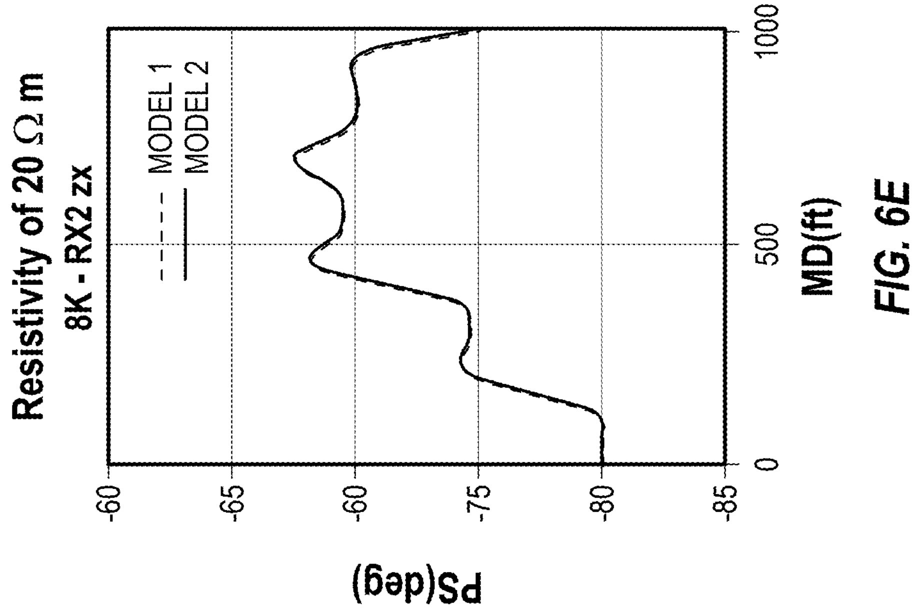
Figure 6D:
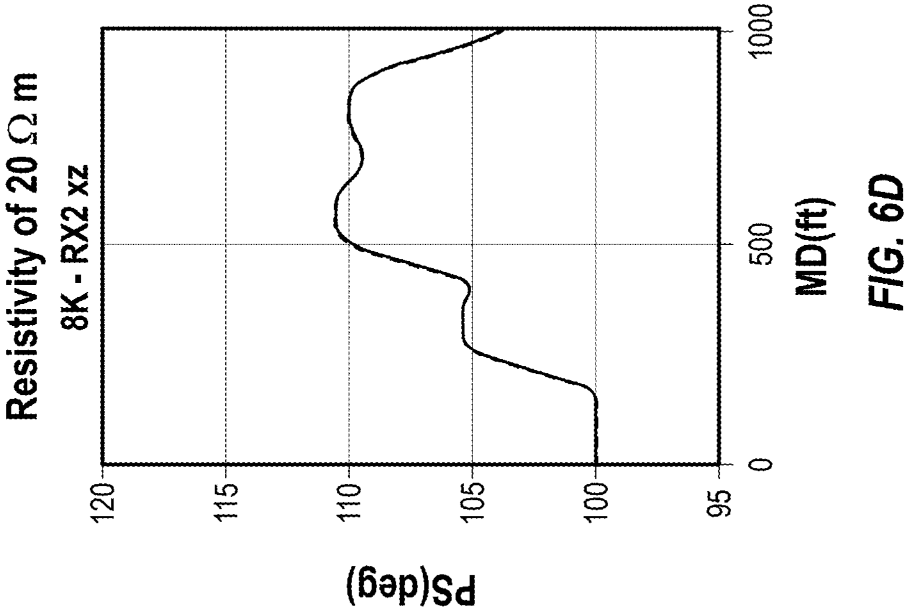

Based on rotating model 400, as illustrated in FIG. 4, which may represent first sub assembly 102, second sub assembly 104, third sub assembly 106, and/or fourth sub assembly 108, any response from any electromagnetic transmitter antenna 134 and electromagnetic receiver antenna 136 combinations may be produced from the components:

$$z_R(\beta) = \begin{bmatrix} \sin\theta_t\cos\beta \\ \sin\theta_t\sin\beta \\ \cos\theta_t \end{bmatrix}^T \begin{bmatrix} z_{XX} & z_{XY} & z_{XZ} \\ Z_{YX} & z_{YY} & Z_{YZ} \\ Z_{ZX} & Z_{ZY} & Z_{ZZ} \end{bmatrix} \begin{bmatrix} \sin\theta_r\cos(\beta+\beta_{ref}) \\ \sin\theta_r\sin(\beta+\beta_{ref}) \\ \cos\theta_r \end{bmatrix} \tag{2}$$

where $Z_R(\beta)$ is the response for an electromagnetic transmitter antenna 134-electromagnetic receiver antenna 136 pair at first sub assembly 102, second sub assembly 104, third sub assembly 106, and/or fourth sub assembly 108 bin azimuth, $\beta$ is first sub assembly 102, second sub assembly 104, third sub assembly 106, and/or fourth sub assembly 108 rotating azimuth, $\beta_{ref}$ is first sub assembly 102, second sub assembly 104, third sub assembly 106, and/or fourth sub assembly 108 face offset between electromagnetic transmitter antenna 134 and electromagnetic receiver antenna 136, $\theta_t$ is the tilt angle of electromagnetic transmitter antenna 134, $\theta_r$ is the tilt angle of electromagnetic receiver antenna 136.

Here, Equation (2) may be further written as the following form with a use curve fitting algorithm to obtain parameters $Z_A$, $Z_B$, $Z_C$, $Z_D$:

$$z_R(\beta') = Z_A\cos(2\beta'+\beta_{ref}) + Z_B\cos(\beta') + Z_C\sin(\beta') + Z_D \tag{3}$$

where $$\begin{cases} \beta' = \beta - \beta_{ref} \\ Z_A = (C_{xx} - C_{yy})/2 \\ Z_B = C_{xx}\cos\beta_{ref} + C_{xx} \\ z_C = -C_{xx}\sin\beta_{ref} \\ z_D = C_{ZZ} + (C_{xx} + C_{yy})\cos\beta_{ref}/2 \end{cases} \tag{4}$$

where $$\begin{cases} C_{xx} = Z_{xx}\sin\theta_t\sin\theta_r \; c_{xx} = Z_{yx}\sin\theta_t\sin\theta_r \; c_{xx} = Z_{zx}\cos\theta_t\sin\theta_r \\ C_{xy} = Z_{xy}\sin\theta_t\sin\theta_r \; c_{xx} = Z_{yy}\sin\theta_t\sin\theta_r \; c_{xx} = Z_{zy}\cos\theta_t\sin\theta_r \\ C_{xz} = Z_{xz}\sin\theta_t\cos\theta_r \; c_{xx} = Z_{yz}\sin\theta_t\cos\theta_r \; c_{xx} = Z_{zz}\cos\theta_t\cos\theta_r \end{cases} \tag{5}$$

As a result, two receivers 136 that are collocated for an electromagnetic transmitter antenna 134, may calculate the components from the curve fitted signals as:

$$\left\{\begin{array}{c} Z_{AR1} = (Z_{xx}\sin\theta_t\sin\theta_{r1} - Z_{yy}\sin\theta_t\sin\theta_{r1})/2 \\ Z_{BR1} = Z_{zx}\cos\theta_t\sin\theta_{r1}\cos\beta_{ref1} + Z_{xz}\sin\theta_t\cos\theta_{r1} \\ Z_{CR1} = -Z_{zx}\cos\theta_t\sin\theta_{r1}\sin\beta_{ref1} \\ Z_{DR1} = Z_{zz}\cos\theta_t\cos\theta_{r1} + (Z_{xx}\sin\theta_t\sin\theta_{r1} + Z_{yy}\sin\theta_t\sin\theta_{r1})\cos\beta_{ref1}/2 \\ Z_{AR2} = (Z_{xx}\sin\theta_t\sin\theta_{r2} - Z_{yy}\sin\theta_t\sin\theta_{r2})/2 \\ Z_{BR2} = Z_{zx}\cos\theta_t\sin\theta_{r2}\cos\beta_{ref2} + Z_{xz}\sin\theta_t\cos\theta_{r1} \\ Z_{CR2} = -Z_{zx}\cos\theta_t\sin\theta_{r2}\sin\beta_{ref2} \\ Z_{DR2} = Z_{zz}\cos\theta_t\cos\theta_{r2} + (Z_{xx}\sin\theta_t\sin\theta_{r2} + Z_{yy}\sin\theta_t\sin\theta_{r2})\cos\beta_{ref2}/2 \end{array}\right. \rightarrow \left\{\begin{array}{l} z_{XX} \\ z_{yy} \\ z_{zz} \\ z_{Xz} \\ z_{2X} \end{array}\right. \quad (6)$$

To decouple air-hang component signals from the tool air-hang response, Equations (3) to (6) may be simplified as:

$$Z_{AIR} = Z_D \quad (7)$$

where $$Z_D = Z_{ZZ}\cos\theta_t\cos\theta_r + Z_{xx}\sin\theta_t\sin\theta_r\cos\beta_{ref} \quad (8)$$

Similarly, with two collocated coil receivers for the same transmitter, an operator may calculate the components from the air-hang response as:

$$\left\{\begin{array}{l} z_{DR1} = Z_{ZZ}\cos\theta_t\cos\theta_{r1} + Z_{xx}\sin\theta_t\sin\theta_{r1}\cos\beta_{ref1} \\ z_{DR2} = Z_{ZZ}\cos\theta_t\cos\theta_{r2} + Z_{xx}\sin\theta_t\sin\theta_{r2}\cos\beta_{ref2} \end{array}\right. \rightarrow \left\{\begin{array}{l} z_{zz} \\ z_{xx} \end{array}\right. \quad (9)$$

FIGS. 5A-5D are graphs illustrating a two-layered transversely isotropic formation model in which upper layer 500 and lower layer 502 have different Rh and Rv resistivities. Upper layer 500 and lower layer 502 may be separated by a modeled wellbore 130 in which logging tool 300 may be modeled at the intersection of '0' x-axis of each graph and modeled wellbore 130. In FIGS. 8A-8D, upper layer 500 may be assumed to be high resistivity, either in 20 or 100 Ω·m, which is why in each graph the resistivity is represented as 'X Ω·m' as 'X' may be either 20 or 100 Ω·m as an example to define a relatively high resistivity formation. Lower layer 502 may be either isotropic with Rh equals to 1 Ω·m and Rv equals to 1 Ω·m (i.e., FIGS. 8A & 8B) in input model 1, which may represent water, or an anisotropic layer with Rh equals to 1 Ω·m and Rv equals to 5 Ω·m (i.e., FIGS. 8C & 8D) in model 2, which may represent sand-shale lamination. Thus, the only difference between input model 1 and input model 2 is the Rv resistivity of lower layer 502.

FIGS. 6A-6E are graphs illustrating modeling responses (8 kHz at transmitter-to-receiver spacing of 50 ft) between the two input models in FIG. 5A-5D while the current layer resistivity is 20 Ω·m. The plots show the responses before measured depth of 1000 ft, which is around 3 ft away from the boundary along the true vertical depth direction. As shown in FIGS. 9A-9E, there are some differences in YY and ZZ components between the two models, indicating that electrical stability measurements have some degree of sensitivity to the anisotropy variations within an anisotropy formation of neighboring layers (i.e., between upper layer 500 and lower layer 502 of FIGS. 5A-5D).

Figures 7A, 7B, 7C:
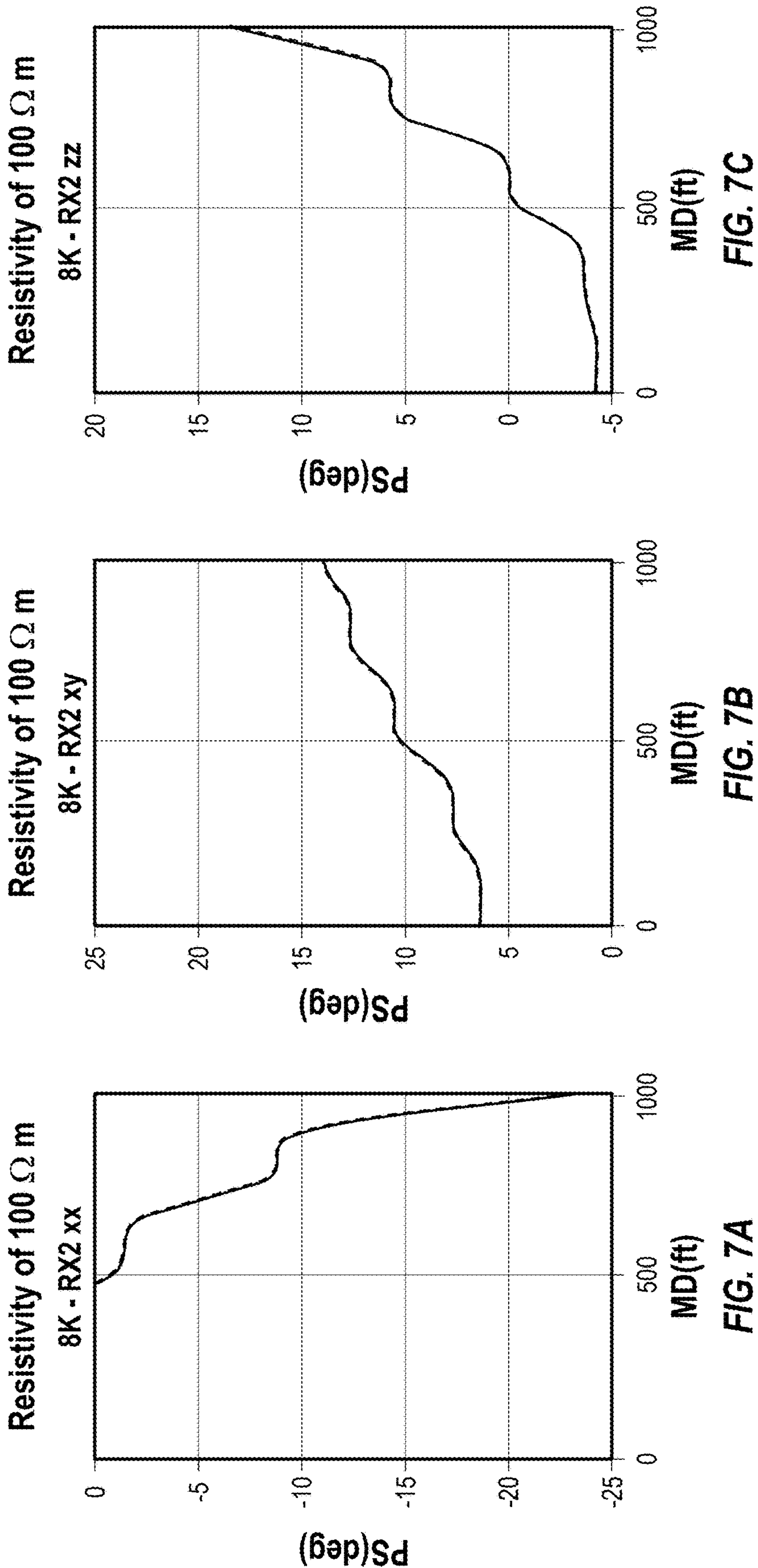

On the other hand, FIGS. 7A-7E are graphs illustrating model responses using same set of measurements as those in FIG. 6A-6E, but the current layer resistivity is now 100 Ω·m. For this example, it may be observed that there is a strong Rh boundary effect on the measurements, resulting in no measurement sensitivity capability for the Rv variations in neighboring layers (i.e., between upper layer 0500 and lower layer 502 of FIGS. 5A-5D). FIG. 7-7E confirms that the difference between the two input models may be minimal and therefore the corresponding 1D inversion may not be able to distinguish between the two models. In other words, the 1D inversion may fail to accurately detect neighboring layer anisotropy properties within an anisotropy formation when logging tool 300 (i.e., referring to FIG. 3) is located in a high resistivity formation using coil antennas for transmitters 134 and receivers 136.

Figure 9A:
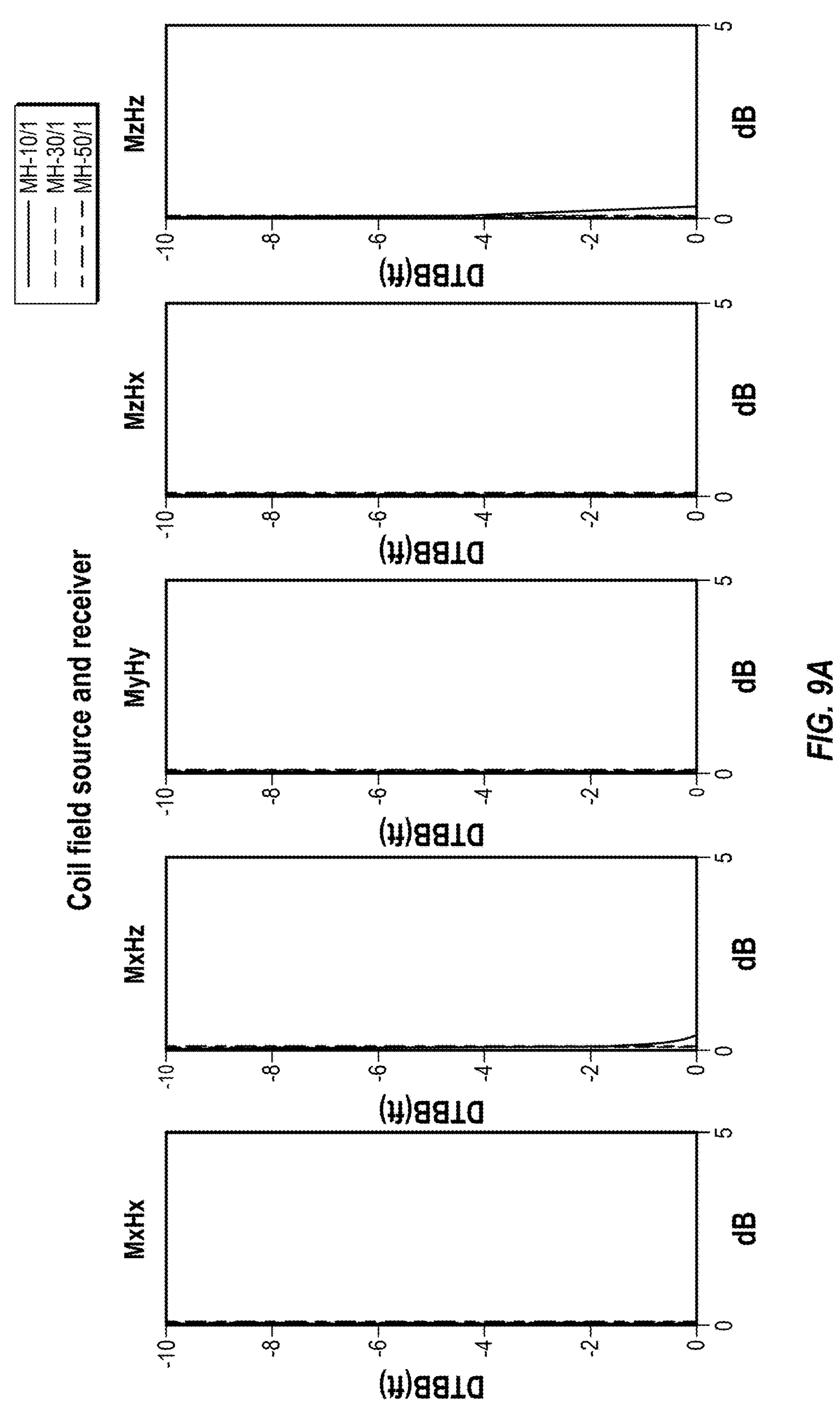
FIGS. 9A-9D are graphs showing measurements from different transmitter and receiver combination on the logging tool.
Figure 9B:
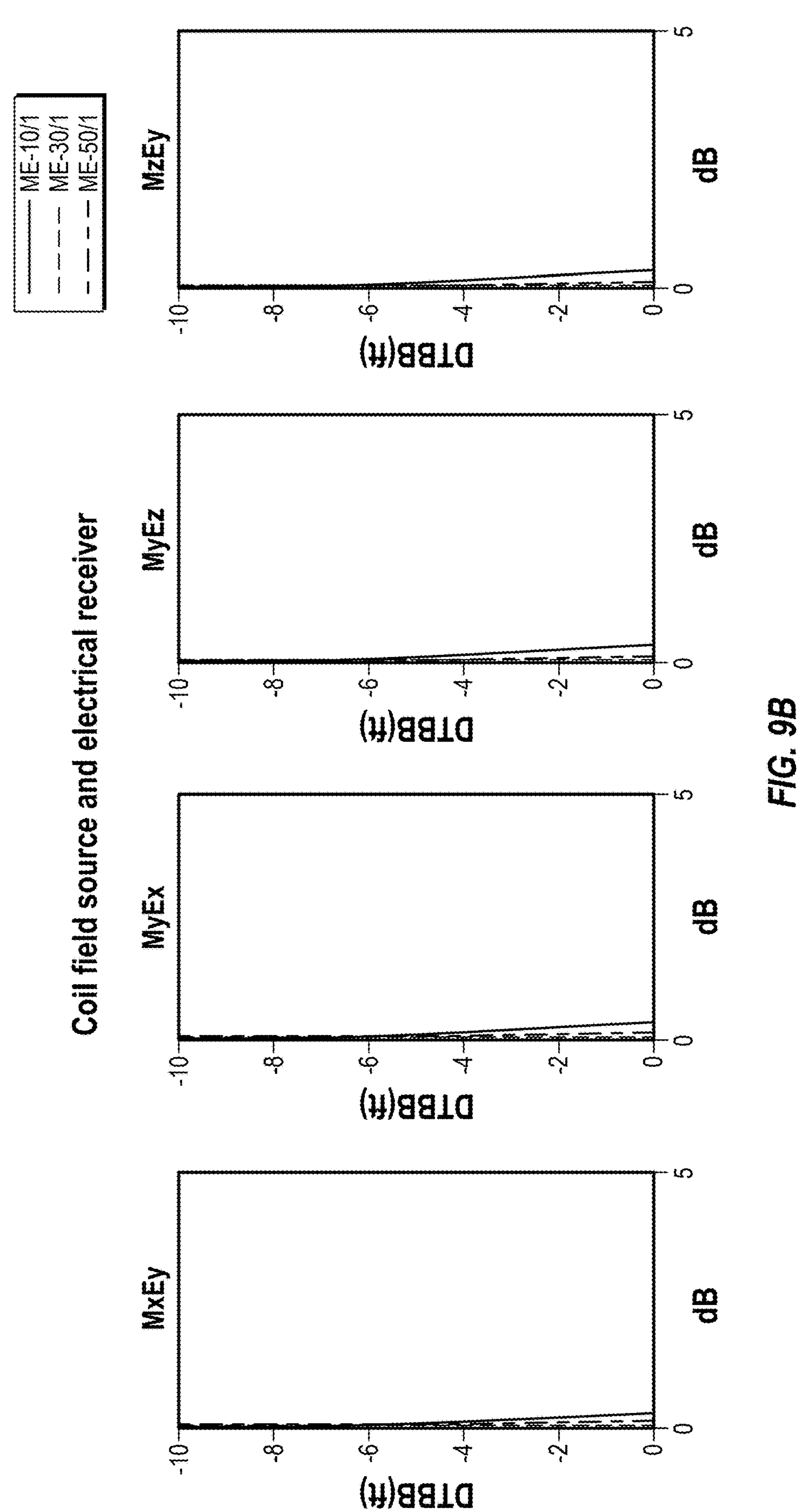
Figure 9C:
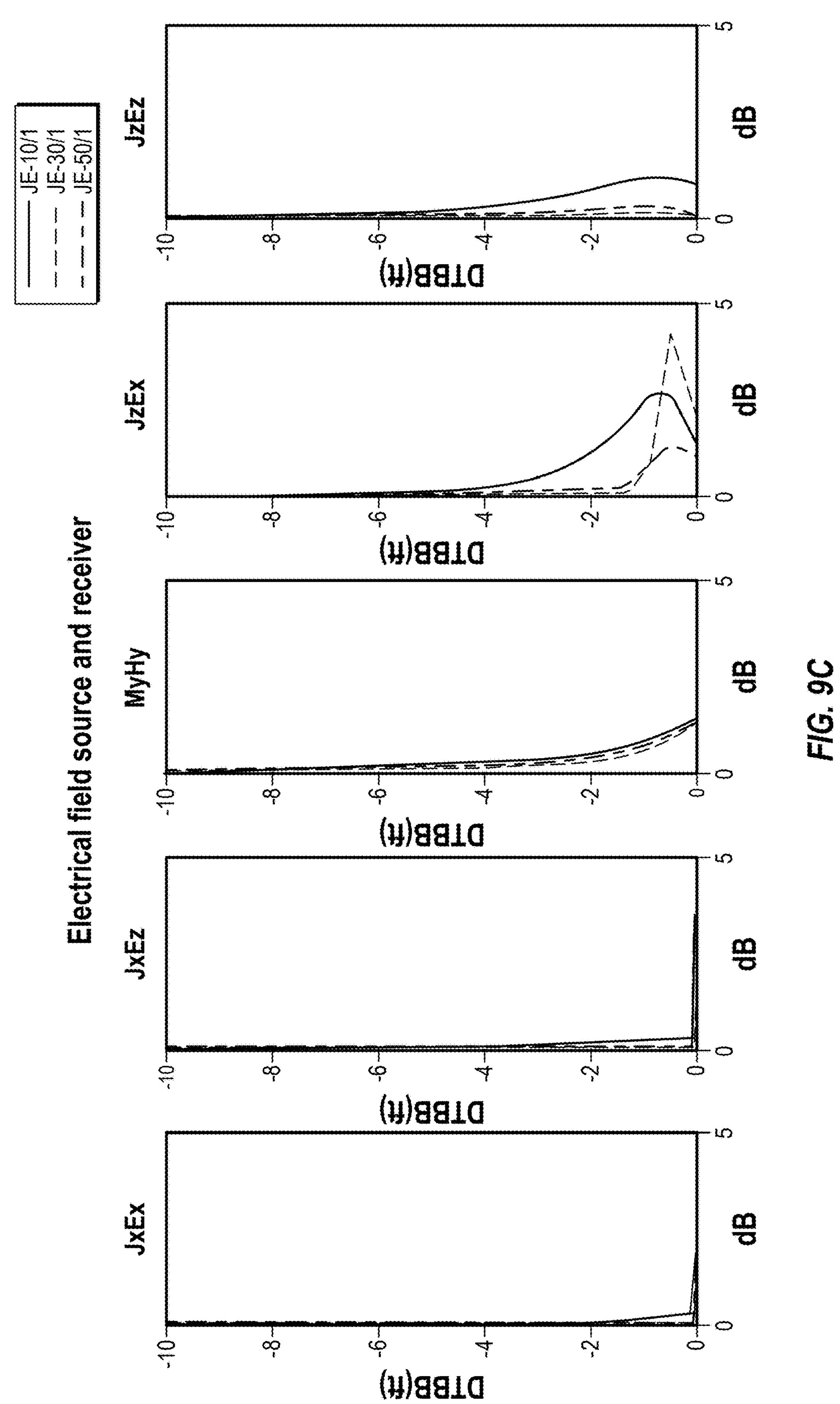
Figure 9D:
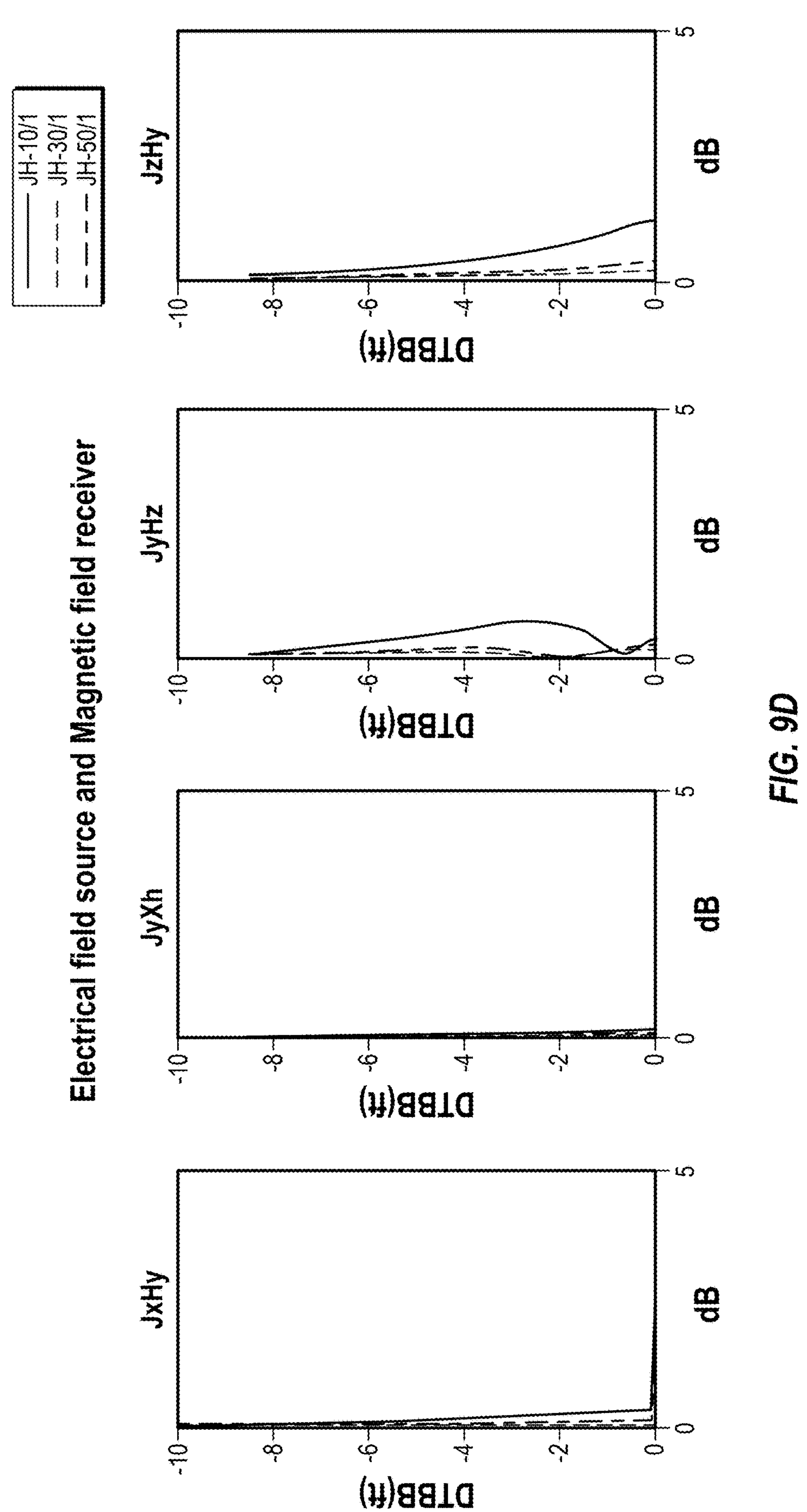

FIGS. 8A and 8B are graphs that further illustrate detection between neighboring layers (i.e., between upper layer 500 and lower layer 502 of FIGS. 5A-5D) using logging tool 300 (i.e., referring to FIG. 3) when electromagnetic transmitter antenna 134 and/or electromagnetic receiver antenna 136 are electric field antennas. As illustrated, FIGS. 8A and 8B are graphs with upper layer 500 having a high resistivity value of 10, 30 or 50 Ω·m. The evaluation is based on the signal difference between the isotropic model (Rh=Rv=1 Ω·m) and the anisotropy model of an anisotropy formation (Rh=1 Ω·m and Rv=5 Ω·m) of lower layer 502 where upper layer 500 has same resistivity value (either 10, 30 or 50 Ω·m). As noted above, upper layer 500 and lower layer 502 may be separated by wellbore 130. FIGS. 9A-9D are graphs illustrating modeling responses of different electromagnetic transmitter antenna 134 and electromagnetic receiver antenna 136 configurations. Three curves at each plot indicate signal differences for upper layer resistivity of 10, 30 or 50 Ω·m, respectively. The signal difference is calculated based on the modeling attenuation difference between an isotropic layer and an anisotropic conductive lower layer 502 when upper layer 500 (e.g., referring to FIGS. 8A & 8B) has the same high resistivity (10, 30 or 50 Ω·m). Consequently, if the difference is 0 dB at depth 0, this indicates there is no difference of a measurement to sense the anisotropy of lower layer 502. Thus, there is no sensitivity for the neighboring anisotropy property determination in an anisotropy formation. As shown in FIG. 9A, the results of the coil field source for electromagnetic transmitter antenna 134 and configuration of electromagnetic receiver antenna 136 illustrate a nominal difference among three different resistivity values for upper layers 500. This electromagnetic transmitter antenna 134 and electromagnetic receiver antenna 136 configuration is the current technology for measurement operations using logging tool 300 (e.g., referring to FIG. 3). On the other hand, graphs for FIGS. 9B-9D plot measurements having an electric field antenna as electromagnetic transmitter antenna 134 and/or electromagnetic receiver antenna 136, which shows much larger signal difference when approaching to the boundary (DTBB=0 ft), suggesting that those configurations may detect the anisotropy variations of lower layer 502 even though logging tool 300 may be located in upper layer 500.

In order to achieve effective anisotropy properties detection in an anisotropy formation, at least one electric field antenna may be utilized on electric field antenna for receiving or transmitting electrical fields. Furthermore, it is possible to design the antenna in such a manner that it may also simultaneously receive and transmit magnetic fields, which is commonly known as a magnetoelectric (ME) dipole antenna. As a result, such magnetoelectric (ME) dipole antennas may be implemented in electric field antenna to enhance anisotropy evaluation.

Methods and systems described above are an improvement over current technology in that equipping a logging tool with an electrical field antenna, whether as a transmitter, receiver, or transceiver, may allow for detecting the surrounding anisotropy through the corresponding measurements. Systems equipped with an electrical field source and/or an electrical field receiver offer higher measurement sensitivity for distinguishing the neighboring anisotropy property variations, as compared to the existing systems. Consequently, the electrical field design is utilized to detect the neighboring anisotropy in adjacent layers or combine the new design with the existing systems to accurately determine all formation properties, including Rh and Rv of all layers, within the measurement detection range.

This method and system may include any of the various features of the compositions, methods, and system disclosed herein, including one or more of the following statements.

Statement 1: A method may comprise disposing a logging tool into a formation. The logging tool may comprise an electromagnetic transmitter antenna and an electromagnetic receiver antenna. The method may further comprise transmitting an electric field signal into the formation from the electromagnetic transmitter antenna, receiving a reflected electric field signal or a magnetic field signal from the formation with the electromagnetic receiver antenna, measuring the reflected electric field signal or the magnetic field signal from the formation with the electromagnetic receiver antenna, and identifying one or more anisotropy properties of adjacent layers in the formation from the reflected electric field signal or the magnetic field signal.

Statement 2: The method of statement 1, wherein the electromagnetic transmitter antenna is a toroidal coil.

Statement 3: The method of statement 1 or 2, wherein the electromagnetic receiver antenna is a toroidal coil or a solenoid coil.

Statement 4: The method of any previous statements 1, 2, or 3, wherein the formation is an anisotropy formation.

Statement 5: The method of statement 4, wherein the anisotropy formation is divided into an upper layer and a lower layer.

Statement 6: The method of statement 5, wherein the upper layer is 20 Ω·m or 100 Ω·m.

Statement 7: The method of statement 5 or 6, wherein the lower layer is 1 Ω·m.

Statement 8: The method of any previous statements 5, 6, or 7, wherein the lower layer where Rh is equal to 1 Ω·m and Rv is equal to 5 Ω·m.

Statement 9: A method may comprise disposing a logging tool into a formation. The logging tool may comprise an electromagnetic transmitter antenna and an electromagnetic receiver antenna. The method may further comprise transmitting a magnetic field signal into the formation from the electromagnetic transmitter antenna, receiving a reflected electric field signal or a magnetic field signal from the formation with the electromagnetic receiver antenna, measuring the reflected electric field signal or the magnetic field signal from the formation with the electromagnetic receiver antenna, and identifying one or more anisotropy properties of adjacent layers in the formation from the reflected electric field signal or the magnetic field signal.

Statement 10: The method of statement 9, wherein the electromagnetic transmitter antenna is a toroidal coil.

Statement 11: The method of statement 10, wherein the electromagnetic receiver antenna is a toroidal coil or a solenoid coil.

Statement 12: The method of statements 10 or 11, wherein the formation is an anisotropy formation.

Statement 13: The method of statement 12, wherein the anisotropy formation is divided into an upper layer and a lower layer.

Statement 14: The method of statement 13, wherein the upper layer is 20 Ω·m or 100 Ω·m.

Statement 15: The method of statement 14, wherein the lower layer is 1 Ω·m.

Statement 16: The method of statement 14 or 15, wherein the lower layer where Rh is equal to 1 Ω·m and Rv is equal to 5 Ω·m.

Statement 17: A method may comprise disposing a logging tool into a formation, wherein the logging tool comprises an electromagnetic antenna, transmitting an electric field signal into the formation from the electromagnetic antenna, and receiving a reflected electric field signal from the formation with the electromagnetic antenna. The method may further comprise measuring the reflected electric field signal from the formation with the electromagnetic antenna and identifying one or more boundaries in the formation from the reflected electric field signal.

Statement 18: The method of statement 17, wherein the formation is an anisotropy formation.

Statement 19: The method of statement 18, wherein the one or more boundaries in the anisotropy formation is divided into an upper layer and a lower layer.

Statement 20: The method of statement 19, wherein the upper layer is 20 Ω·m or 100 Ω·m, and the lower layer is an isotropic layer with 1 Ω·m or an anisotropic layer where Rh is equal to 1 Ω·m and Rv is equal to 5 Ω·m.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:

disposing a logging tool into a formation, wherein the logging tool comprises:

an electromagnetic transmitter antenna; and an electromagnetic receiver antenna, wherein at least one of the electromagnetic transmitter antenna or the electromagnetic receiver antenna comprises an electric field antenna;

broadcasting an electric field signal into the formation from the electromagnetic transmitter antenna;

receiving a reflected electric field signal or a magnetic field signal from the formation with the electromagnetic receiver antenna;

measuring the reflected electric field signal or the magnetic field signal from the formation with the electromagnetic receiver antenna; and identifying one or more anisotropy properties of adjacent layers in the formation from the reflected electric field signal or the magnetic field signal, wherein the electric field antenna allows detection of the one or more anisotropy properties based on the reflected electric field signal, the magnetic field signal, or both.

2. The method of claim 1, wherein the electromagnetic transmitter antenna is a toroidal coil.

3. The method of claim 1, wherein the electromagnetic receiver antenna is a toroidal coil or a solenoid coil.

4. The method of claim 1, wherein the formation is an anisotropy formation.

5. The method of claim 4, wherein the anisotropy formation is divided into an upper layer and a lower layer.

6. The method of claim 5, wherein the upper layer has a resistivity of is 20 Ω·m or 100 Ω·m.

7. The method of claim 5, wherein the lower layer has a resistivity offs 1 Ω·m.

8. The method of claim 5, wherein the lower layer where Rh is equal to 1 Ω·m and Rv is equal to 5 Ω·m.

9. A method comprising:

disposing a logging tool into a formation, wherein the logging tool comprises:

an electromagnetic transmitter antenna; and an electromagnetic receiver antenna, wherein at least one of the electromagnetic transmitter antenna or the electromagnetic receiver antenna comprises an electric field antenna;

transmitting a magnetic field signal into the formation from the electromagnetic transmitter antenna;

receiving a reflected electric field signal or a magnetic field signal from the formation with the electromagnetic receiver antenna;

measuring the reflected electric field signal or the magnetic field signal from the formation with the electromagnetic receiver antenna; and identifying one or more anisotropy properties of adjacent layers in the formation from the reflected electric field signal or the magnetic field signal, wherein the electric field antenna allows detection of the one or more anisotropy properties based on the reflected electric field signal, the magnetic field signal, or both.

10. The method of claim 9, wherein the electromagnetic transmitter antenna is a toroidal coil.

11. The method of claim 10, wherein the electromagnetic receiver antenna is a toroidal coil or a solenoid coil.

12. The method of claim 10, wherein the formation is an anisotropy formation.

13. The method of claim 12, wherein the anisotropy formation is divided into an upper layer and a lower layer.

14. The method of claim 13, wherein the upper layer has a resistivity of 20 Ω·m or 100 Ω·m.

15. The method of claim 14, wherein the lower layer has a resistivity of 1 Ω·m.

16. The method of claim 14, wherein the lower layer has a horizontal resistivity Rh equal to 1 Ω·m and a vertical resistivity Rv equal to 5 Ω·m.

17. A method comprising:

disposing a logging tool into a formation, wherein the logging tool comprises an electromagnetic antenna, wherein the electromagnetic antenna comprises an electric field antenna;

broadcasting an electric field signal into the formation from the electromagnetic antenna;

receiving a reflected electric field signal from the formation with the electromagnetic antenna;

measuring the reflected electric field signal from the formation with the electromagnetic antenna; and identifying one or more boundaries in the formation from the reflected electric field signal, wherein the electric field antenna allows detection of one or more anisotropy properties associated with the formation based on the reflected electric field signal.

18. The method of claim 17, wherein the formation is an anisotropy formation.

19. The method of claim 18, wherein the one or more boundaries in the anisotropy formation is divided into an upper layer and a lower layer.

20. The method of claim 19, wherein the upper layer has a first resistivity of 20 Ω·m or 100 Ω·m, and the lower layer is an isotropic layer with a second resistivity of 1 Ω·m or an anisotropic layer where a horizontal resistivity Rh is equal to 1 Ω·m and a vertical resistivity Rv is equal to 5 Ω·m.

* * * * *